UNITED STATES PATENT OFFICE.

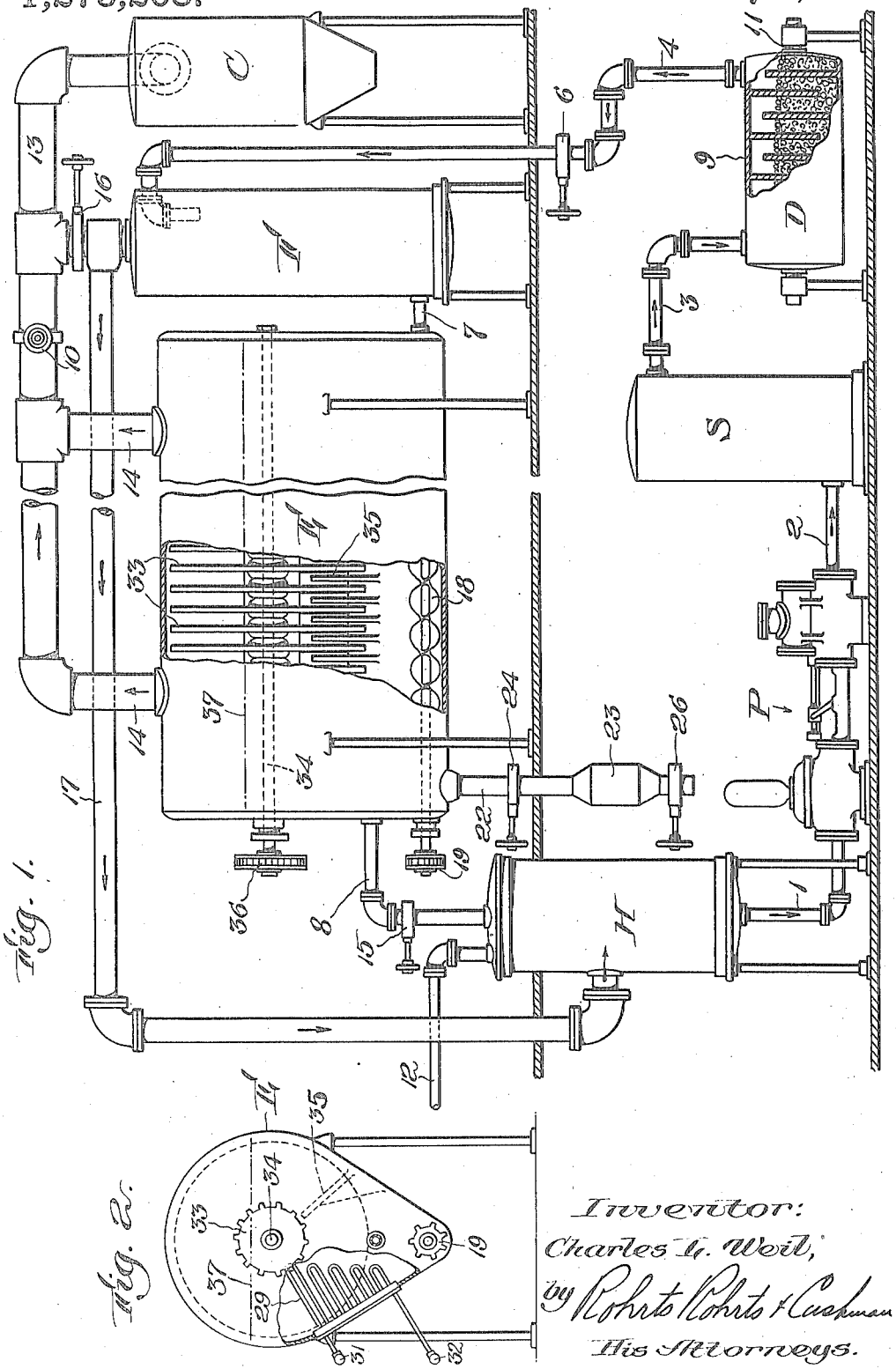

CHARLES L. WEIL, OF PORT HURON, MICHIGAN.

SALT MANUFACTURE.

1,273,208.

Specification of Letters Patent.

Patented July 23, 1918.

Application filed November 3, 1917. Serial No. 200,003.

*To all whom it may concern:*

Be it known that I, CHARLES L. WEIL, citizen of the United States of America, and resident of Port Huron, in the county of St. Clair and State of Michigan, have invented new and useful Improvements in Salt Manufacture, of which the following is a specification.

This invention relates to the manufacture of salt or the like by the evaporation of brine or other liquid and more particularly the invention relates to improvements in the Alberger system of salt making.

In the so-called Alberger method of manufacturing salt, brine is continuously circulated through an evaporating system, the brine being heated at one or more points of the system and being permitted to evaporate at other points, thereby being caused to give up the salt contained therein. The Alberger system, in its simpler form, is usually arranged substantially as disclosed in my former United States Patent No. 1,141,999 to which I make reference for a more thorough understanding of the system in its entirety.

In brief, the system is comprised and operated as follows: The brine is first heated in a preheater to a temperature somewhat below the boiling point, which is approximately 226° F. for saturated brine. Thence the brine is pumped under sufficient pressure to prevent boiling to a superheater where it is heated for example to a temperature of the order of 275° F. Thence it is conducted, still under pressure, to a filter in which impurities such as gypsum are removed, the gypsum precipitating at a temperature of the order of 275° F. From the filter the superheated brine is conducted to a flasher, that is, a closed evaporating vessel in which the pressure is atmospheric or at least much lower than in the superheater and filter, and in the flasher the brine flashes or boils violently owing to the reduction of pressure to a point considerably below that at which the superheated brine will boil. From the flasher the rich, saturated brine is passed to an evaporating pan at a temperature approximately of the boiling point and in the evaporating pan it is allowed to cool about twenty-five degrees, surface evaporation taking place at the expense of the contained heat of the brine. The portion of the brine which is not evaporated either in the flasher or in the pan, the so-called tail brine, is conducted to the preheater and thence again over the described course, new brine being supplied to the preheater in sufficient quantity to compensate for the evaporation in the flasher and pan.

In the flasher the rapid evaporation together with the violent agitation produced by the flashing of steam from the already saturated brine produces fine, clean-cut and well-formed crystals of salt which are carried over into the evaporating pan suspended in the brine. In the evaporating pan large crystals of salt are produced at the surface of the brine due to the slow surface evaporation taking place, and in connection with this surface formation of salt a very important phenomenon of the Alberger process takes place, viz.: To the crystals formed at the surface by slow evaporation the fine crystals produced in the flasher adhere or build and by virtue of this building-up process crystals of a wide variety of sizes are formed. This building-up action is probably accelerated by the cooling of the brine in the pan. Moreover, the building process takes place to a certain extent throughout the body of the brine. The large crystals formed at the surface of the brine and the smaller crystals formed in the body of the brine, together with some of the fine crystals produced in the flasher, are caused to settle to the bottom of the pan and are then drawn off by a trap, a static leg, or by other suitable means. The salt is then dried and screened, the crystals being separated according to size and thus affording the various commercial grades known as table, butter, meat, ice-cream, and other salts.

Whereas common salt produced by the ordinary methods is composed of hard cubical grains or of grains of a more or less hard and relatively coarse granular structure, Alberger salt is composed of flakes of finely formed crystalline structure. It will dissolve more readily and will flavor food more uniformly than will the ordinary grades of salt. The unique characteristics of Alberger salt are believed to be due in part to the violent boiling of the brine in the flasher, whereby fine crystals of salt are produced, and in part to the building-up process in the evaporating pan, whereby the fine crystals of salt produced in the flasher and carried over into the pan are caused to knit together or build up and thus form crystals of larger size but of the same clean-cut and high-grade character.

While the superiority of Alberger salt has been generally recognized for many years it has also been well known that the method presents a serious difficulty, namely, the difficulty of controlling the proportionate amounts of the crystals of different sizes. Throughout the seasons of the year the demand for the various grades varies widely and to meet the varying demand it has been necessary to store large quantities of certain grades during different seasons. Many methods for controlling the quantitative formation of the crystals of the different sizes have been proposed, but so far as I am aware none of them have been wholly satisfactory. Some of the methods are complicated and lead to other difficulties while others are inadequate for effecting a sufficient control.

The principal objects of the present invention are to overcome the above and other difficulties heretofore appertaining to the most economical operation of the Alberger system, to control completely and efficiently the proportionate amounts of the various grades of salt yielded by the Alberger process, and generally to control the character of salt produced by film evaporators. Other objects of the invention will be apparent from the following description and the accompanying drawings, in which—

Figure 1 is an elevational view, more or less diagrammatic, showing one embodiment of the present invention; parts being broken away and parts being shown in section; and Fig. 2 is an end elevation of the evaporator shown in Fig. 1.

The illustrated embodiment of the present invention resembles the ordinary Alberger system in that it comprises a preheater H for heating the brine to a temperature of the order of the boiling point, a second heater S for superheating the brine to a temperature considerably above the boiling point, for example, of the order of 275°, a filter D, a flasher F, an evaporator E and a condenser C. The brine is circulated around this system by means of gravity and a pump P, the brine passing from the preheater H to the pump through pipe 1, from the pump to the superheater through pipe 2, from the superheater to the filter D through pipe 3, from the filter D to the flasher F through pipe 4, a valve 6 being provided in pipe 4 to regulate the flow of liquid therethrough, the portion of the brine which is not evaporated in the flasher F passing from the flasher to the evaporator E through the pipe 7, and the portion of the brine which is not evaporated either in the flasher or in the evaporator passing to the preheater H through the pipe 8, so as again to make the circuit, a valve 15 being provided in pipe 15 to regulate the flow from the evaporator to the preheater.

By suitably regulating the valve 6 the pressure of the brine in the superheater S and filter D can be maintained sufficiently high to prevent evaporation of the brine in this portion of the system. The gypsum and other impurities contained in the brine are precipitated by the high temperature imparted to the brine in the superheater and are removed from the brine in passing through the tortuous passage formed in the filter D by the baffle-plates 9 extending in staggered relationship from the opposite sides of the inner wall of the filter, stones 11 or other suitable material being provided within the filter upon which the gypsum adheres. New brine is continuously supplied to the system through pipe 12 so that the quantity of brine circulating through the system is maintained substantially constant notwithstanding continuous evaporation in the flasher F and evaporator E. The heaters H and S may be of any desired construction, but they are preferably constructed as disclosed in my prior patent above referred to.

The flasher F communicates with the condenser C through a pipe 13, and the evaporator E communicates with the condenser in like manner through pipes 14. The pressure in the flasher F may be regulated by controlling the temperature in the condenser C or by means of a valve 16. The pressure in evaporator E may be regulated by means of a valve 10 in pipe 14. Owing to the removal of pressure from the brine after it passes through the valve 6 into the flasher F, it flashes or boils rapidly in the flasher, as above described. Inasmuch as the saturated brine boils in flasher F at a temperature of the order of 226° F., the steam given off in the flasher F is more or less superheated depending upon the pressure in the flasher, and it may therefore be employed in heating the preheater H, the steam being conducted from the flasher to the preheater through pipe connections 17.

My improved evaporator E is preferably drum-shaped, that is, it is preferably curved in cross-section and preferably considerably longer than it is wide; indeed in practice I prefer to make the length about one hundred diameters. Moreover, the improved evaporator is preferably egg-shaped in cross-section, that is, it is wider at the top than at the bottom, the sides gradually drawing inwardly as they extend downwardly. This construction affords several advantages, chief of which is that the surface area of the liquid in the vessel varies as the depth of the liquid in the vessel is increased or decreased. However, it is to be understood that the evaporator may be varied in shape and still afford this important function. Another advantage in having the evaporator of the peculiar cross-sectional contour, more particularly illustrated in Fig. 2, is that the precipitated crystals of salt or the like are caused to accumulate in the trough-like bottom of the condenser in such manner as to be readily collected and removed.

The preferred method of removing the precipitated salt is that illustrated in Fig. 1, which comprises a screw conveyer 18 disposed in the bottom of the evaporator and extending longitudinally thereof. Suitable means for operating the screw conveyer 18 comprises pulley 19 and belt disposed on the outside of the evaporator and driven by any suitable means. The conveyer is rotated in such direction as to move the salt toward the left-hand end (Fig. 1) of the evaporator and at said end means are provided for withdrawing the salt. While I may use any suitable means such as the well-known static leg for this purpose, I prefer to employ means such as illustrated in Fig. 1. This means comprises a depending pipe 22 connecting with a drum 23, valves 24 and 26 being disposed above and below the drum 23. By opening valve 24 and closing valve 26 salt may be allowed to settle into the drum 23. After the drum becomes partially or entirely filled the valve 24 is closed and the valve 26 opened so that the salt within the drum is dumped out. By this means the brine within the evaporator is prevented from escaping in any considerable amount and the pressure in the evaporator is not disturbed.

According to the present invention one stage of the process involves evaporating the brine in layers or films and the preferred means for this purpose comprises disks 33 rotatably mounted in the evaporator E so as to extend partly below and partly above the surface 37 of the brine in the evaporator. The illustrated means for rotating the disks comprises a shaft 34 journaled in the opposite ends of the evaporator and provided with a sprocket wheel 36 adapted to be connected with a suitable source of power. As the disks are rotated thin layers or films of brine are carried up from the body of the brine through the space above the brine and during the passage of the films through this space evaporation takes place forming salt on the disks. In order to remove the salt formed on the disks I provide scrapers 35 or other suitable means.

In Fig. 2 I have also illustrated means for controlling the temperature of the liquid in the evaporator, this means comprising, for example, loops of piping 29 extending inwardly from one side of the evaporator, these loops being connected at their respective ends with a pipe 31 for supplying a heating or cooling fluid and to a pipe 32 for conducting away the temperature controlling medium. The temperature controlling means may be employed either to retard or accelerate the cooling of the brine in the evaporator, depending upon whether an increased proportion of coarse or fine salt is desired.

The operation of the system is, in general, similar to that of the ordinary Alberger system above outlined, but it differs therefrom in the following particulars: The pressure in the closed evaporator may be controlled either by regulating the conditions of temperature and pressure in the condenser or by means of valve 10. By closing the valve 10 and thereby increasing the pressure in the evaporator, the rate of evaporation is decreased; conversely, by opening the valve steam is allowed to escape more rapidly to the condenser C, thereby permitting the pressure to be maintained at a lower value. By passing hot water, steam, or other heated fluid through steam, or other heated fluid through the coils 29, the temperature of the brine within the evaporator may be increased, thereby decreasing the rate of cooling; conversely, by passing a cooling fluid through the coils 29 the rate of cooling of the brine may be accelerated. The rate of surface evaporation may be increased or decreased by varying the level of brine in the evaporator, the brine preferably being maintained at the level of the maximum diameter of the evaporator under average conditions of operation. In the illustrated system the valve 15 serves to control the level of the brine. Moreover, the surface evaporation of the brine may be controlled by regulating the rate of rotation of the disks 33, and this method of control is the cardinal feature of the present invention, as will now appear.

If the disks 33 rotate rapidly the film of brine clinging to a given area of a disk, as the area emerges from the body of the brine, will only be exposed a short time in the space above the brine before it is again submerged in the body of the brine. During this brief interval of time only a relatively small amount of evaporation will take place and the aforesaid building-up action of the small crystals to form larger flakes will take place only to a very limited extent. Thus the flakes of salt produced on the disks will be comparatively small. Now if the disks be rotated more slowly the film of brine adhering to a given area of a disk will be exposed a longer time and a greater amount of evaporation from the area will take place before it is submerged. Consequently the building-up action will advance farther and larger flakes of salt will be produced. Thus by regulating the length of time that the films of brine are exposed the proportionate quantities of large-flake and small-flake salt may be controlled.

In view of the above description of the construction and mode of operation of the preferred embodiment of my improved system, the novel method of the present invention may be readily understood. In its broader aspect the method comprises regulating the length of time a given area of brine is evaporated so as to control the character of salt produced by the evaporation. This is preferably accomplished by evaporating the brine in layers or films, and the preferred manner of doing this comprises moving members through the brine and thence through an evaporating space so that films of brine adhere to the members and are carried through the evaporating space, as for example, is above described. By regulating the interval of time required for the films to travel through the evaporating space the character of the salt produced may be controlled. This method of control may be utilized to advantage in open evaporating pans but it is of particular utility in closed evaporators, such as illustrated in the drawings, for reasons which will now be set forth.

As above explained, the proportionate amounts of the larger and finer grades of salt produced by the Alberger system may be controlled by regulating the temperature, pressure and surface evaporation of the brine in the evaporator. While this control may be effected by varying any one or more of these factors, a complete, flexible, and universally satisfactory control is afforded only by the conjoint use of all of these methods. If the temperature and pressure alone are varied, the rate of evaporation may be correspondingly varied, but the rate at which the building-up process takes place throughout the body of the brine is also varied. On the contrary, by merely varying the surface evaporation of the brine in the evaporator the quantity of larger salt produced at the surface of the brine may be controlled to a large extent, but the ratio of the salt produced by the building-up action to the salt produced by a direct precipitation of the fine cystals coming from the flasher cannot be adequately controlled. By varying the pressure alone the surface evaporation and consequently the proportionate amount of coarse surface salt may be controlled to a certain extent, but the ratio of the salt produced by the building-up action to the salt produced by a direct precipitation of the fine crystals coming from the flasher cannot be adequately controlled. By varying the temperature alone the action within the body of the brine may be regulated but the rate of evaporation at the surface of the brine and the building-up action at the surface cannot be adequately controlled. However, by varying both the temperature and the pressure and also the surface evaporation of the brine the proportionate quantities of large, fine and intermediate sizes of salt may be completely and effectively controlled.

I claim:

1. The method of manufacturing salt from brine comprising first flashing the brine so as to produce relatively small crystals of salt, then cooling the brine with a surface area exposed to evaporation so as to form relatively large crystals of salt at the surface and so as to build up the small crystals upon the large crystals, some of the small crystals being permitted to settle without substantial building-up, continuously bringing new brine to said surface, and regulating the rate of changing the brine at said surface to control the proportionate quantities of large and small crystals produced.

2. The method of manufacturing salt from brine comprising first boiling the brine so as to produce relatively small crystals of salt, then cooling the brine to a temperature permitting it to evaporate so as to form relatively large crystals of salt at the surface of the brine and so as to build up the small crystals upon the large crystals, spreading the brine in shallow layers with surfaces exposed to evaporate during said cooling, and controlling the time of the exposure so as to regulate the proportionate quantities of large and small crystals thus produced.

3. In manufacturing salt from brine by first flashing the brine and then slowly evaporating the brine by continuously bringing new brine to the space above the brine, the method of controlling the proportionate quantities of large and small crystals of salt produced comprising regulating the rate of bringing new brine to said space.

4. In manufacturing salt from brine by first flashing the brine and then slowly evaporating the brine from disk evaporators, the method of controlling the character of the salt produced comprising regulating the rate of rotation of the disks.

5. The method of manufacturing salt from brine comprising evaporating the brine from a given surface area, changing the brine at the surface area at a regulable rate, and regulating the temperature of the brine independently of the rate of evaporation, thereby to control the character of salt produced.

6. The method of manufacturing salt from brine comprising evaporating the brine from a given surface area in a closed vessel, changing the brine at the surface area, and regulating the pressure in the closed vessel, thereby to control the character of salt produced.

7. The method of manufacturing salt from brine comprising passing films of brine through an evaporation space so as to expose each film to surface evaporation, regulating the rate of passage of the films through the evaporation space, and regulating the temperature of the brine independently of the rate of evaporation, thereby to control the character of salt produced.

8. The method of manufacturing salt from brine comprising passing films of brine through a closed evaporation space so as to expose each film to surface evaporation, regulating the rate of passage of the films through the evaporation space, and regulating the pressure in said closed space, thereby to control the character of salt produced.

9. The method of manufacturing salt from brine comprising first boiling the brine so as to produce relatively small crystals of salt, then cooling the brine with a surface area exposed to evaporation so as to form relatively large crystals of salt at the surface and so as to build up the small crystals upon the large crystals, continuously changing the brine at said surface area during said cooling, regulating the rate of said changing so as to produce the desired degree of building-up at the surface, and regulating the temperature of the brine independently of the rate of evaporation, thereby to produce predetermined proportionate quantities of large and small crystals of salt.

10. The method of manufacturing salt from brine comprising first flashing the brine so as to produce relatively small crystals of salt, then cooling the brine in a closed space with a surface area exposed to evaporation so as to form relatively large crystals of salt at the surface and so as to build up the small crystals upon the large crystals, continually changing the brine at said surface area during said cooling, regulating the rate of said changing so as to produce the desired degree of building-up at the surface, and regulating the pressure in said closed space, thereby to produce predetermined proportionate quantities of large and small crystals of salt.

Signed by me at Port Huron, St. Clair county, Mich., this 26th day of October, 1917.

CHARLES L. WEIL.